United States Patent [19]
Glaus et al.

[11] 3,851,683
[45] Dec. 3, 1974

[54] SEALING DEVICE

[75] Inventors: Heinrich Glaus, Niederwangen; David Jeanmaire, Hinterkappelen, both of Switzerland

[73] Assignee: Strapex AG, Wohlen, Aargau, Switzerland

[22] Filed: Jan. 12, 1973

[21] Appl. No.: 322,982

[30] Foreign Application Priority Data
Jan. 22, 1972  Switzerland............................ 902/72

[52] U.S. Cl. .............................................. 140/93.4
[51] Int. Cl. ............................................... B21f 9/02
[58] Field of Search................ 140/93.2, 93.4, 123.6

[56] References Cited
UNITED STATES PATENTS
| | | | |
|---|---|---|---|
| 2,375,769 | 5/1945 | Childress et al. .................. | 140/93.4 |
| 3,198,218 | 8/1965 | Ericsson et al. ................... | 140/93.4 |
| 3,380,485 | 4/1968 | Plattner et al. .................... | 140/93.4 |
| 3,411,551 | 11/1968 | Plattner ............................. | 140/93.4 |
| 3,650,301 | 3/1972 | Karass.............................. | 140/93.4 |

*Primary Examiner*—Lowell A. Larson
*Attorney, Agent, or Firm*—Imirie, Smiley & Linn

[57] ABSTRACT

A sealing device for applying seals to overlapping strips, the device including a sealing clamp for the seals, a seal magazine, a stripper for inserting seals into the clamp and a common actuating lever for the clamp and the stripper, the actuating lever in a first part of a rotary motion displacing the open sealing clamp and closing it in a second part of the rotary motion, wherein the stripper moves an actuating link with a seal completely closed, into its effective starting position for stripping off a new seal at the end of the second part of the rotary motion the beginning of the stripping movement of the new seal being effected before the seal enters the clamp.

12 Claims, 3 Drawing Figures

SEALING DEVICE

BACKGROUND OF THE INVENTION

The present invention relates to a device for clamping seals around the ends of overlapping strips. The device has a clamp for the seals, a seal magazine, and means for inserting seals in the clamp. A common actuating lever for the clamp and a stripper is provided, the lever in the first part of a rotary motion displacing the open clamp and in a second part of the rotary motion, closing the clamp.

SUMMARY OF THE INVENTION

It is an object of the invention to provide a device of this kind which is particularly reliable and simple in operation.

According to the present invention there is provided a sealing device for applying seals to overlapping strips, the device including a sealing clamp for the seals, a seal magazine a stripper for inserting seals into the clamp, and a common actuating lever for the clamp and the stripper, the actuating lever in a first part of a rotary motion displacing the open sealing clamp and closing it in a second part of the rotary motion, wherein the stripper moves an actuating link with a seal completely closed, into its effective starting position for stripping off a new seal at the end of the second part of the rotary motion, the beginning of the stripping movement of the new seal being effected before the seal enters the clamp.

The device ensures that a further seal cannot be partially inserted in the sealing clamp before the end of the sealing operation. This could lead to faults and possible damage. On the other hand it is ensured that a new seal is always stripped off reliably and at the correct time and then inserted in the sealing clamp.

Reference is now made to the accompanying drawings, which show an embodiment of a device in accordance with the invention.

DETAILED DESCRIPTION OF THE INVENTION

Figure 1:
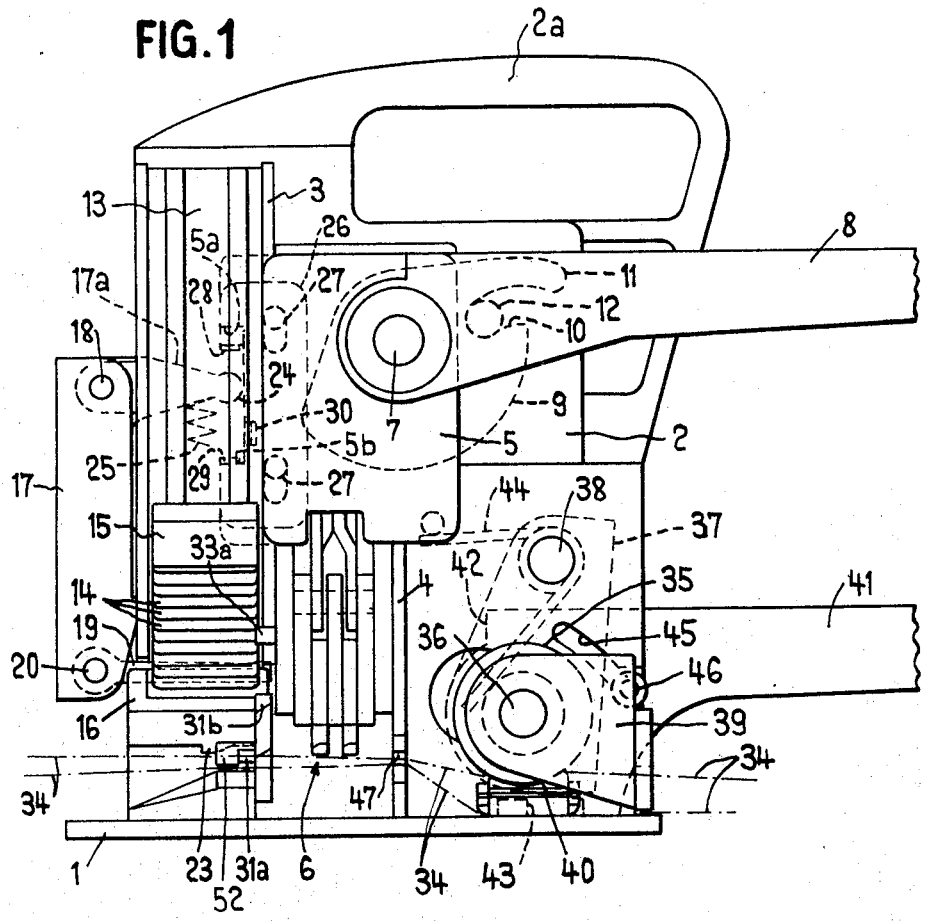
FIG. 1 is a side view of the clamping device according to the present invention.

The sealing device shown has a base 1, a frame 2 mounted thereon and a handgrip 2a. A carrier 5 for the sealing clamps between vertical guides is mounted so as to be vertically displaceable. The carrier 5 consists of sheet metal members connected together to form a box. By means of an axle 7 an actuating lever 8 is mounted in the carrier 5. On the opposite side of the carrier 5 a cam disc 9 is connected to the axle 7; it is provided with a slot 10 and nose 11 adjacent thereto. In the inoperative position of the actuating lever 8 (as shown) a pin 12 connected to the frame engages in the slot 10. Within the box-shaped carrier 5 toothed segments are connected to the axle 7, which segments act on racked bars mounted so as to be vertically displaceable to actuate the sealing clamps 6 which are of known form.

There is a magazine 13 for seals, in the lower part of which there is a stack of seals 14 joined together as shown. The stack of seals is subject to the action of a spring-loaded ram 15 which urges the stack of seals downwards.

Figure 2:
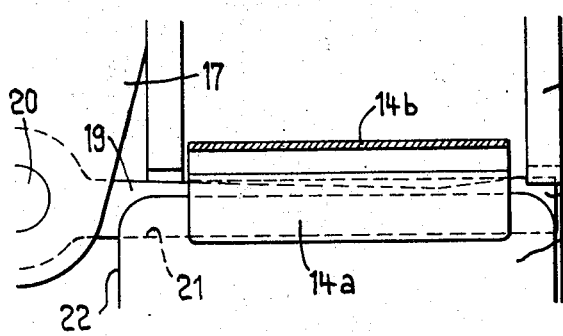
FIG. 2 shows a cutaway portion on an enlarged scale from FIG. 1 and partly in section.

On the outside of the magazine 13 there is a stripper link 17 pivotal about the axle 18. On the lower end of this link there is a stripper finger 19 pivotal about an axle 20. As shown in FIG. 2, the stripper finger 19 is slightly thickened at one end. The lowermost seal 14a shown in FIG. 2 rests on the stripper finger 19, with the surfaces of the abutment 22 adapted to the form of the seals. The next higher seal 14b is shown in section in FIG. 2, to illustrate the spacing between the seals in the stack to be engaged by the stripper finger 19. The stripper link 17 is provided with an arm 17a projecting behind the magazine 13 horizontally into the frame of the device and having an actuating head 24. A compression spring 25 acts on the arm 17a and urges the stripper link 17 into a rest position.

On the rear surface of the clamp carrier 5 there is a slider 26 vertically displaceable over a distance limited by means of pins 27 engaging in slots of this slider. The slider 26 has two tongues 28, 29 bent over downwards which in a manner to be described below co-operate with the head 24 of the arm 17a. The tongues 28 and 29 co-operate with stops 5a and 5b on the ends of a cutout of the rear plate of the clamp carrier 5. A further bent-out tongue 30 of the slider 26 co-operates in a manner described below with the projection 11 of the cam disc 9.

Figure 3:
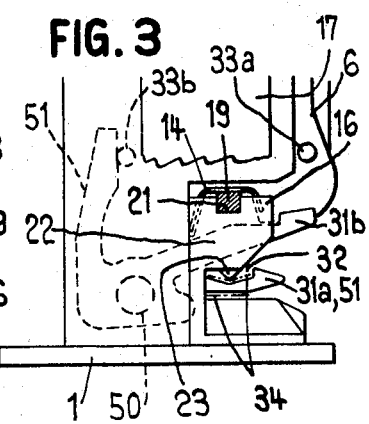
FIG. 3 is a vertical section of a part of the device.

On the block forming the abutment 16 there are strip shears having a fixed shear blade 31a and a moving shear blade 31b pivotal about an axis 50 with a return arm 51. Pins 33a and 33b connected to the clamps 6 actuate the pivotal blade 31b or its return arm 51 in a manner described below. As shown in FIG. 3 there is a gap for inserting the end of a strip below the fixed shear blade 31a. This blade 31a and/or a tongue 52 of the block 22 adjacent thereto has a recess 32 which is deeper in the centre than at the ends, and in the region of the recess 32 the block 22 has a holding device 23 which retains the end of the strip inserted, slightly bent, in the recess 32. This retains the upper end 34 of the strip arriving from the roller after it has been cut off, so that it is prevented from slipping out of the device and dropping out, so that it can be readily engaged again for further sealing operations.

A tension roller is shown in FIG. 1 and denoted by 35. It is mounted by means of a spindle 36 in a rocker arm 37, which in turn is mounted in the frame about an axle 38. In front of the tension roller 35 there is a strip guide 39 loosely mounted on an axle 36 which also helps to retain the end 34 of the strip to be tensioned, in the region of the tension roller 35. The end 34 of the strip is passed between the tension roller 35 and an abutment 40. On the rear surface of the device there is a hand lever 41 pivotally mounted on the shaft 36. This lever, by means of a ratchet mechanism (not shown) permits the shaft 36 or the tension roller 35 to be driven in a clockwise direction. The hand lever 41 is provided with a stop shoulder 42 which, when the lever 41 is pivotally moved from the position shown through approximately 180° in a counterclockwise direction, strikes against a stop 43 on the base 1. When this occurs, and when the hand lever is pivotally moved further in a counterclockwise direction, the tension roller 35 is pivoted upwards against spring 44 in a clockwise direction, with the pivotal arm 37, and hence lifted off the abutment 40. The strip guide 39 is lifted with the tension roller 35, their position being determined by a roller 46 entering a slot 45 of one frame plate. The strip guide 39 is unable to tilt about the shaft 36, but is lifted as a whole to facilitate the insertion of a new end of a strip between tension roller 35 and abutment 40.

The abutment 40 is vertically displaceable through a limited distance and, as indicated by FIG. 1, serves as clamping jaw for the lower end of the strip. Both ends of the strip are passed through between the shears and the tension device and through a further guide slot 47 of the guide plate 4, to be retained spaced apart in the region of the clamps 6.

FIG. 1 shows the sealing device in a position ready for action, i.e., the ends of the strip are inserted and the sealing operation may take place. For this purpose the actuating lever 8 is rotated in a counterclockwise direction. This pivotal movement is transmitted to the cam disc 9, in the slot 10 of which the pin 12 engages. Consequently, the parts 7, 8 and 9 are rotated with the lever and a downwards movement of these parts together with the clamp carrier 5 also occurs. The clamps are moved downwards into the open position. After a small movement the tongue 28 of the slider 26 strikes from above against the head 24 of the lever arm 17a. The slider 26 remains stationary and after further downward movement the clamp carrier 5 slides upwards until the stop 5a strikes from above against the tongue 28 of the slider 26. The slider 26 is now engaged by the clamp carrier 5, so that the tongue 28 acting on the head 24 is pivotally moved against the action of the spring 25 in a clockwise direction about the axle 18. This causes the stripper finger 19 to be pulled from below the stack of seals. In the meantime the simultaneous pivotal movement of the actuating lever 8 and downwards movement of the clamp carrier 5, the shaft 7 and the cam disc 9 is such that the pin 12 has left the slot 10 of the cam disc 9. From this point no further downward movement of the carrier 5 occurs, and the pin 12 now slides over the circular part of the cam disc 9. During further rotation of the actuating lever 8 in a counterclockwise direction, the clamp is actuated via the above-mentioned toothed segments and racked bars; it closes and presses an open seal located therein during an earlier working cycle around superposed ends of the strip. The downward movement effected by the clamp carrier 5 or the slider 26 did not pull the stripper finger 19 completely from under the stack of seals, so that it is impossible for a new seal to be engaged and fed to the clamp at the incorrect moment. After further rotation of the actuating lever 8, and shortly before the ending of the sealing operation of the clamp, the nose 11 of the cam disc 9 strikes against the tongue 30 of the slider 26. This slider is additionally downwardly displaced with regard to the fixed clamp carrier 5 and causes a further rotation of the stripper lever 17 in a clockwise direction; this is followed by complete removal of the stripper finger 19 from the stack of seals. The stack now drops onto the abutment 16, so that by reinserting the stripper finger 19 the lowermost seal is engaged and inserted into the clamp. This operation, however, does not take place immediately during the return movement of the actuating lever 8 in a clockwise direction, since the spring 25 cannot exert sufficient force on the stripper finger 19 to release the lowermost seal from the stack. The release does not occur until after a degree of return movement of the actuating lever 8, when the pin 12 has already re-entered the slot 10 of the cam disc 9 and the carrier 5 with the slider 26 has risen to such an extent that the lower tongue 29 of the slider 26 strikes against the head 24 and moves the stripper lever 17 and the stripper finger 19 to strip the lowermost seal from the stack. Once the lowermost seal has been detached from the stack, then the force of the spring 25 suffices to slide this seal into the clamp, which has just assumed the right position to receive this seal. The various parts now return into the position shown, and the clamp has been filled with a new seal.

During the downwards and sealing movement of the clamp the pin 33a has engaged the pivotal shearing blade 31b after the pin 33b has released the arm 51. The upper end 34 of the strip has then been cut off. During the lifting of the clamp 6 at the end of the sealing operation, the pin 33b engages the return arm 51 and returns the shearing blade 31b into the inoperative position shown. The end of the strips still retained beneath the clamping roller 35 or the abutment 40 are then released, and the hand lever 41 is pivoted in a clockwise direction through rather more than 180°, so that the shoulder 42 strikes against the stop 43, whereupon continued pivotal movement of the lever 41 lifts the tension roller 35 and the strip guide 39. The two strip sections, no longer clamped, can now be removed, or the apparatus pulled laterally away from the strip. When the tension roller 35 and the strip guide 39 are raised, new strip sections may be inserted, whereupon the lever 41 is returned in a clockwise direction until the tension roller 35 presses again with full pressure of the spring 44 on the abutment 40 and clamps the upper strip section between the abutment and the base 1. By reciprocating the lever 41 the tension roller 35 is intermittently rotated in a clockwise direction via the ratchet mechanism, so that the upper strip section 34 is brought up and hence the strip is tensioned. After this operation a new sealing operation may be initiated.

The above description shows that the device is particularly reliable in operation and can easily be operated. The device incorporates an effective safeguard against premature stripping and insertion of a new seal, and the stripped seals are reliably guided into a clamping position. Stripping of a new seal from the stack at the required period of time is ensured by a rigid control, whilst the actual insertion of the seal into the clamp is effected by spring force at the correct position of the clamp. The shears are also positively actuated, so that the setting of the pivotal shearing cutter is not critical.

We claim:

1. Sealing device for applying seals to overlapping strips, comprising clamping means for securing the seals to the strips, a seal magazine disposed adjacent said clamping means to support a stacked array of seals, stripping means coupled with said seal magazine for inserting a seal from said stacked array into said clamping means, a common actuating lever for said clamping means and said stripping means, an actuating spring coacting with said stripping means to bias the same in a seal inserting direction, lost motion coupling means between said common actuating lever and said stripping means wherein said actuating lever displaces an open seal toward the strips during a first part of actuating motion and causes said clamping means to close the displaced seal about the strips during a second part of such actuating motion and wherein said stripping means is moved to a starting position for stripping off a new seal from said magazine at the end of said second part of said actuating motion when said displaced seal is completely closed, said actuating spring having a force sufficient for displacing a seal released from said magazine but insufficient for releasing a seal from said magazine, return movement of said actuating lever causing said lost motion coupling means to reach the end of its lost-motion stroke for positively actuating said stripping means to release a seal which is thereafter immediately shifted into said clamping means by said actuating spring.

2. A device according to claim 1, wherein movement of said stripping means is initially effected by displacement of said clamping means, and then directly by movement of the actuating lever.

3. A device according to claim 2, wherein said lost motion coupling means includes an engaging member for said stripping means which is secured on said clamping means with lost motion in the direction of displacement of said clamping means, said actuating lever acting directly on the engaging member as well as indirectly thereon through said clamping means.

4. A device according to claim 3, wherein said engaging member has spaced stops for engaging a control lever of said stripping means with lost motion.

5. A device according to claim 1, wherein said stripping means has a stripping finger pivotally connected to a stripper lever for movement in a guide in said magazine.

6. A device according to claim 5, wherein said stripping finger is guided normal to its stripping movement between said guide and a wall of the seal magazine.

7. A device according to claim 1 further including strip shears, one part thereof having a recess of strip width to serve as holder for the strip.

8. A device according to claim 7, wherein said recess is deeper in the center than at the ends, so that the strip is located therein in bent form, and further including a holding down member engaging the strip at said recess.

9. A device according to claim 1 further including a tension roller actuatable by means of a hand lever via a ratchet mechanism for one strip end, wherein the tension roller together with a strip guide is mounted on a rocker arm such that the tension roller and strip guide are pivotable away from an abutment and cooperate to pull the strip taut.

10. A device according to claim 9, wherein said hand lever has a stop which cooperates with a stop on a frame of the device to move the tension roller and strip guide pivotally.

11. A device according to claim 1, further including strip shears, a displaceable blade thereof being positively moved in either one of two directions of movement in response to movement of said actuating lever.

12. A device according to claim 11, wherein said displaceable shear blade is provided with a return arm, and wherein said actuating lever includes actuating members for closing and opening the shears in response to alternate engagement of said pivotal shear blade and said return arm, respectively.

* * * * *